US010809213B2

(12) United States Patent
Daw et al.

(10) Patent No.: US 10,809,213 B2
(45) Date of Patent: Oct. 20, 2020

(54) SENSORS FOR MEASURING THERMAL CONDUCTIVITY AND RELATED METHODS

(71) Applicant: Battelle Energy Alliance, LLC, Idaho Falls, ID (US)

(72) Inventors: Joshua Daw, Idaho Falls, ID (US); Troy C. Unruh, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 272 days.

(21) Appl. No.: 15/827,891

(22) Filed: Nov. 30, 2017

(65) Prior Publication Data

US 2019/0162682 A1 May 30, 2019

(51) Int. Cl.
*G01N 25/18* (2006.01)
*G01K 1/00* (2006.01)
*G01K 13/00* (2006.01)
*G01K 7/00* (2006.01)
*G01N 25/00* (2006.01)
*G01N 27/00* (2006.01)
*G01N 27/18* (2006.01)

(52) U.S. Cl.
CPC ........... *G01N 25/18* (2013.01); *G01N 25/005* (2013.01); *G01N 27/002* (2013.01); *G01N 27/18* (2013.01)

(58) Field of Classification Search
USPC .................................. 374/44, 208, 141, 163
See application file for complete search history.

(56) References Cited

U.S. PATENT DOCUMENTS

| | | | |
|---|---|---|---|
| 4,928,254 A | 5/1990 | Knudsen et al. |
| 5,667,300 A | 9/1997 | Mandelis et al. |
| 6,175,120 B1 | 1/2001 | McGregor et al. |
| 6,479,826 B1 | 11/2002 | Klann et al. |
| 6,528,797 B1 | 3/2003 | Benke et al. |
| 6,545,281 B1 | 4/2003 | McGregor et al. |
| 6,570,165 B1 | 5/2003 | Engdahl et al. |
| 6,727,505 B2 | 4/2004 | Benke et al. |
| 6,781,132 B2 | 8/2004 | McGregor |

(Continued)

OTHER PUBLICATIONS

McGregor et al., "Micro-pocket fission detectors (MPFD) for in-core neutron flux monitoring", Nuclear Instruments and Methods in Physics Research, Section A, 554 (Aug. 2005) pp. 494-499.

(Continued)

*Primary Examiner* — Mirellys Jagan
(74) *Attorney, Agent, or Firm* — TraskBritt

(57) ABSTRACT

A sensor for measuring thermal conductivity includes an insulator, a test material over the insulator, a conductor over the test material, and a gas within an open volume adjacent the test material and the conductor. An electrical source is configured to provide an alternating current through the conductor to heat the test material. Leads are connected to the conductor and configured to connect to a voltmeter. A method of measuring thermal conductivity includes disposing the sensor in a reactor core in which a nuclear fuel undergoes irradiation and radioactive decay. An alternating current is provided from the electrical source through the conductor to heat the test material. A voltage is measured as a function of time at the leads connected to the conductor. A thermal conductivity of the test material is calculated based on the voltage measured as a function of time. Methods of forming a sensor are also disclosed.

15 Claims, 2 Drawing Sheets

(56) References Cited

U.S. PATENT DOCUMENTS

| | | |
|---|---|---|
| 6,806,474 B2 | 10/2004 | McGregor et al. |
| 6,815,687 B1 | 11/2004 | Branch-Sullivan et al. |
| 6,921,903 B2 | 7/2005 | McGregor |
| 7,164,138 B2 | 1/2007 | McGregor et al. |
| 7,855,372 B2 | 12/2010 | McGregor et al. |
| 7,871,198 B2 | 1/2011 | Rempe et al. |
| 8,065,810 B2 | 11/2011 | Rempe et al. |
| 8,519,350 B2 | 8/2013 | McGregor et al. |
| 8,778,715 B2 | 7/2014 | Bellinger et al. |
| 8,783,948 B2 | 7/2014 | Panda et al. |
| 9,081,100 B1 | 7/2015 | Bellinger et al. |
| 9,182,364 B1 | 11/2015 | Condie et al. |
| 9,465,120 B1 | 10/2016 | Bellinger et al. |
| 9,625,590 B1 | 4/2017 | Bellinger et al. |
| 2002/0032845 A1 | 3/2002 | McGregor et al. |
| 2003/0034456 A1 | 2/2003 | McGregor |
| 2003/0042426 A1 | 3/2003 | McGregor et al. |
| 2003/0136916 A1 | 7/2003 | Kearfott et al. |
| 2005/0017181 A1 | 1/2005 | Kearfott et al. |
| 2005/0258372 A1 | 11/2005 | McGregor et al. |
| 2006/0023828 A1 | 2/2006 | McGregor et al. |
| 2006/0043308 A1 | 3/2006 | Mcgregor et al. |
| 2006/0056573 A1 | 3/2006 | McGregor et al. |
| 2006/0291606 A1 | 12/2006 | McGregor et al. |
| 2007/0018110 A1 | 1/2007 | McGregor et al. |
| 2008/0205483 A1 | 8/2008 | Rempe et al. |
| 2008/0224457 A1 | 9/2008 | Brough et al. |
| 2009/0302231 A1 | 12/2009 | McGregor et al. |
| 2010/0254503 A1 | 10/2010 | Rempe et al. |
| 2012/0217406 A1 | 8/2012 | McGregor et al. |
| 2013/0040095 A1 | 2/2013 | Ariesanti et al. |
| 2013/0228696 A1 | 9/2013 | McGregor et al. |
| 2013/0344636 A1 | 12/2013 | Bellinger et al. |
| 2014/0362965 A1 | 12/2014 | Heibel et al. |
| 2017/0010370 A1 | 1/2017 | Bellinger et al. |
| 2017/0153340 A1 | 6/2017 | Bellinger et al. |

OTHER PUBLICATIONS

Wang et al., "Analysis of 3w method for thermal conductivity measurement", International Journal of Heat and Mass Transfer, (Mar. 2009) 30 pages.

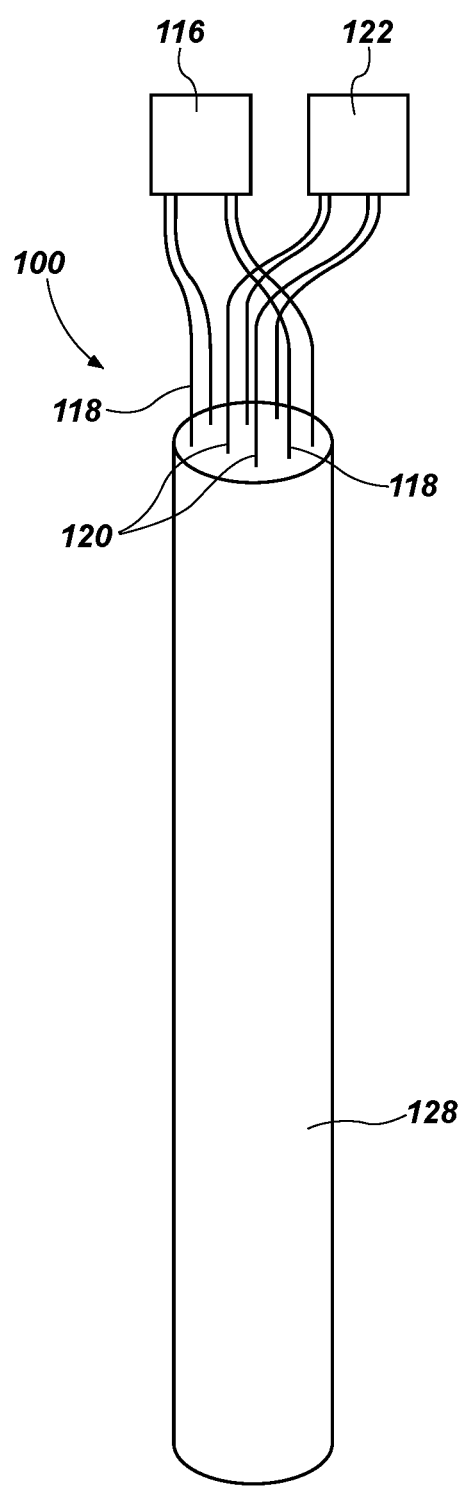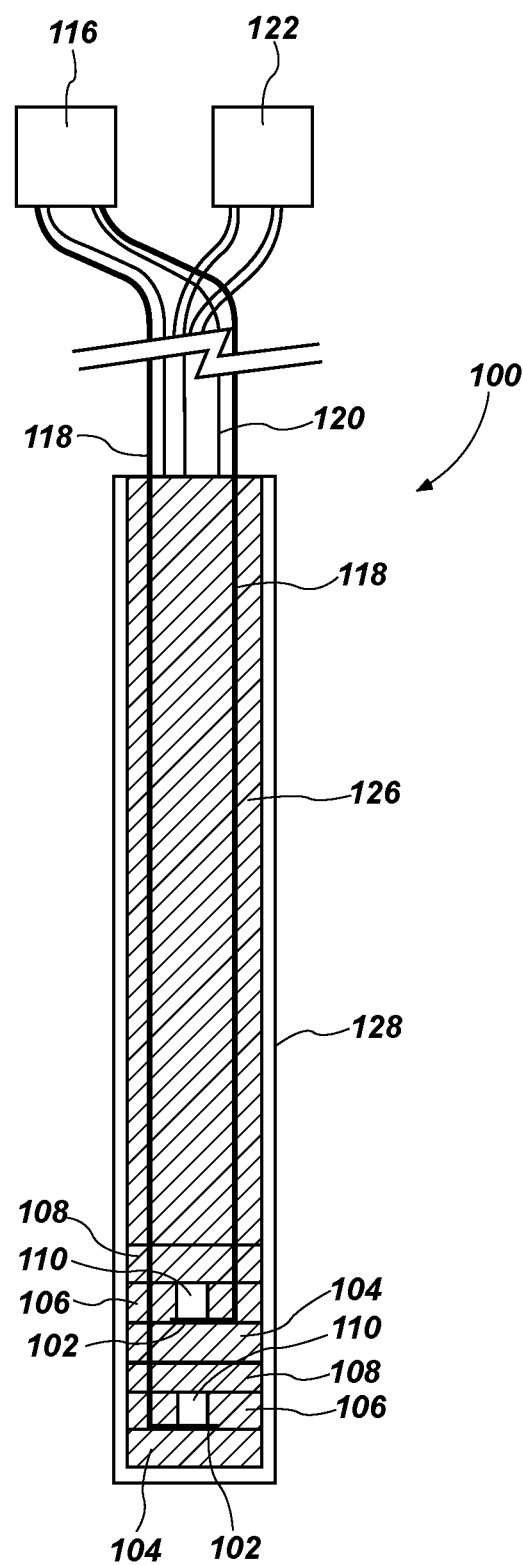
FIG. 1
FIG. 2

SENSORS FOR MEASURING THERMAL CONDUCTIVITY AND RELATED METHODS

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the present disclosure relate generally to devices and methods for measuring thermal conductivity.

BACKGROUND

In the design of systems, it may be desirable to know thermophysical properties of materials within the system for proper design, testing, and application. Thermophysical properties such as thermal conductivity may be calculated by steady-state or transient methods. Steady-state methods generally include applying a heat source to a side of a sample and measuring the difference in temperature between the heated side and an unheated side of the sample after the sample has reached equilibrium. Transient methods (i.e., non-steady state methods) do not require a sample to reach equilibrium. Generally, transient methods include applying heat to a sample and measuring a change in temperature of the sample over a given period of time. Such methods include hot-wire methods which include inserting an electrically heated wire into a sample. As the heat flows from the wire into the sample, the temperature of the wire is measured. The thermal conductivity can be determined by comparing the temperature of the wire to the logarithm of time. Methods using a hot-wire may include a "probe" method. In this configuration, the thermal conductivity of a sample is determined from the response of a "needle" inserted into the sample to be measure. The probe contains a hot-wire heater and a thermocouple. Devices such as the KD2 thermal conductivity meter, available from Decagon Devices, Inc. of Pullman, Wash., employ this method. Other methods include a dynamic hot-wire method, in which a wire embedded in the sample serves simultaneously as heating element and temperature sensor. During the measurement, the wire is heated by means of a constant electric power. The mean temperature of the hot-wire as a function of time can be measured by means of the temperature-dependent resistance of the wire. This temperature dependence depends on the thermal conductivity of the specimen.

In the case of nuclear reactors, it is desirable to know the thermophysical properties such as thermal conductivity of nuclear fuels. Because thermal conductivity is a transport property, the diffusion process of energy transfer is dependent on the physical structure, chemical composition, and state of the material. Thermal conductivity is important for understanding fuel and material performance during irradiation because fuels and materials undergo significant changes during irradiation. Furthermore, there is relatively limited data characterizing advanced fuels developed for next-generation nuclear energy systems.

In the case of nuclear fuels, the physical structure and chemical composition may change during irradiation as a function of time and position within a rod. Monitoring the thermal conductivity of nuclear fuels may assist in measuring fuel performance and the development of nuclear fuel having higher burn-up. Typically, thermal conductivity, as well as other thermophysical properties of samples of nuclear fuel, are measured out-of-pile (i.e., outside of a nuclear reactor) in "hot-cells," after these samples are irradiated for a specific length of time (otherwise known as a "cook-and-look" process). However, repeatedly removing samples of nuclear fuel from the reactor to make out-of-pile measurements is expensive, has the potential to disturb phenomena of interest, and only provides understanding of the sample's end state at the time each measurement is made. However, such data is needed for the development of next-generation reactors and advanced fuels for existing nuclear plants. Having the capacity to effectively and quickly characterize fuel properties during in-pile irradiation has the potential to improve the fidelity of nuclear fuel data and reduce irradiation costs.

Few in-pile (i.e., within the nuclear reactor or "in-situ") measurement techniques for thermophysical properties are currently available. Generally, devices employing hot-wire methods discussed above are not suitable for operation within the extreme environmental condition of a nuclear reactor. One steady-state approach relies on data from a thermocouple in the fuel rod to give centerline temperature and a second thermocouple placed on the exterior of the cladding housing the fuel. The thermal conductivity may be calculated using the difference in temperatures of the thermocouples. However, this approach requires application of several assumptions about the fuel, such as uniform fuel composition, uniform fuel density, heat transfer through gaps between the fuel and the cladding housing the fuel, and uniform heat generation distribution of the fuel rod. Furthermore, the thermocouple exterior to the cladding is exposed to the coolant disposed between the fuel rods and, in some instances, may not be in direct contact with the outer cladding of the fuel rod. Changes in the system, such as swelling of the fuel and deformation of the cladding, may alter the system and the variables, rendering the assumptions made to calculate the thermal conductivity incorrect, causing inaccurate results.

BRIEF SUMMARY

In some embodiments, a sensor for measuring thermal conductivity includes an insulator, a test material over the insulator, a conductor over the test material, and a gas within an open volume adjacent the test material and the conductor. An electrical source is configured to provide an alternating current through the conductor to heat the test material. A pair of leads is connected to the conductor and configured to connect to a voltmeter.

A method of measuring thermal conductivity includes disposing a sensor in a reactor core in which a nuclear fuel undergoes irradiation and radioactive decay. The sensor includes an insulator, a test material over the insulator, a conductor over the test material, and a gas within an open volume adjacent the test material and the conductor. An alternating current is provided from an electrical source through the conductor to heat the test material. A voltage is measured as a function of time at a pair of leads connected to the conductor. A thermal conductivity of the test material is calculated based on the voltage measured as a function of time.

A method of forming a sensor includes providing a test material over an insulator, providing a conductor over and in contact with layer of the test material, sealing a gas within an open volume adjacent the test material and the conductor, connecting the conductor to an electrical source configured to provide an alternating current through the conductor to heat the test material, and connecting a pair of leads to the conductor. The pair of leads is configured to connect to a voltmeter.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

FIG. 1 is a simplified perspective view illustrating a sensor;

FIG. 2 is a simplified cross section of the sensor of FIG. 1; and

DETAILED DESCRIPTION

Figure 3:
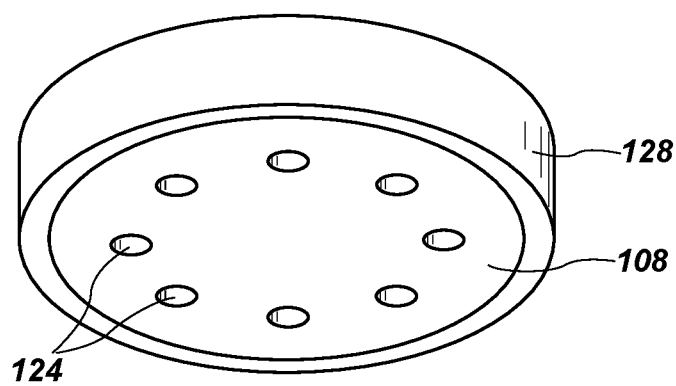
FIG. 3 is a simplified exploded view of a portion of the sensor of FIG. 1.
Figure 3:
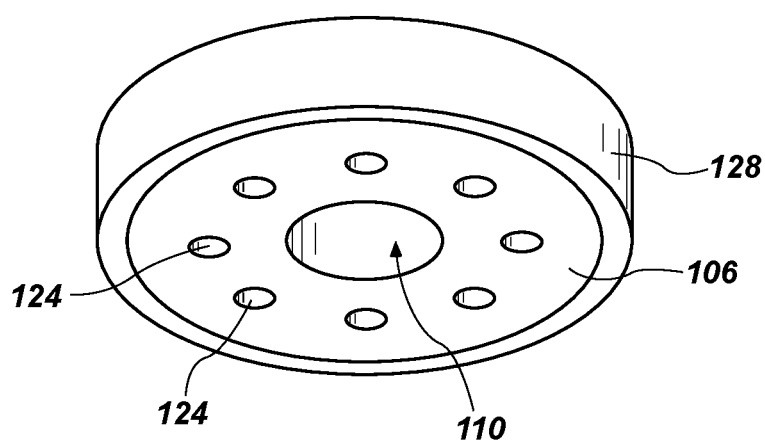
Figure 3:
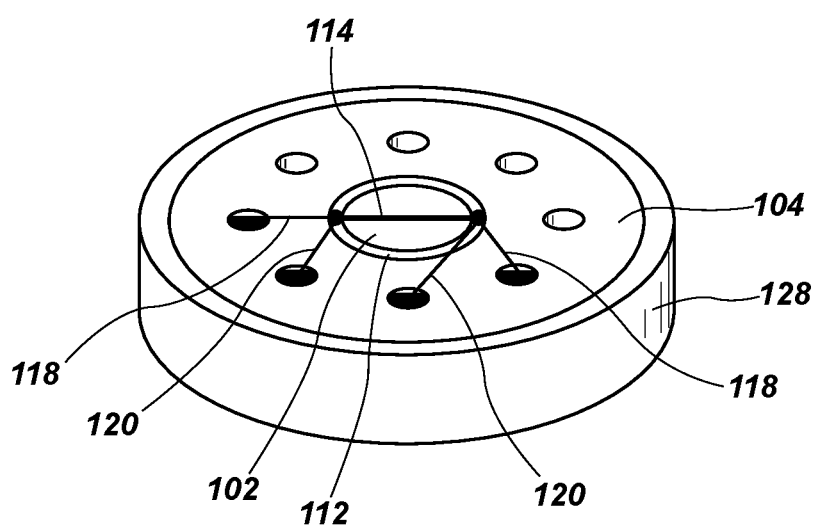

The illustrations presented herein are not actual views of any particular equipment, device, or process, but are merely idealized representations that are employed to describe example embodiments of the present disclosure. Additionally, elements common between figures may retain the same numerical designation.

A sensor as described herein may be used for measuring thermal conductivity of a material, such as a radioactive material. The sensor may include an insulator, a layer of a test material over the insulator, and a conductor over the layer of test material. A gas may be present within an open volume adjacent the layer of the test material and the conductor. An electrical source provides an alternating current through the conductor to heat the layer of the test material, and a voltmeter measures the voltage across pair of leads connected to the conductor.

As used herein, the terms "insulator," "insulating material," and "nonconductive material" mean and include a material exhibiting such a low electrical conductivity that the flow of current through the material is negligible (i.e., electric charges do not flow freely within the material).

As used herein, the terms "conductor" and "conductive material" mean and include a material exhibiting a high electrical conductivity such that current can flow through the material (i.e., electric charges flow freely within the material).

As used herein, the term "open volume" means and includes a volume which does not include solid matter and, in implementation of embodiments of the disclosure, may contain a gas. The term "open" does not mean or imply that the referenced volume is communicable with a surrounding environment. Stated another way, the term "open volume" does not mean or imply that the volume may not be completely physically enclosed.

FIG. 1 is a simplified perspective view illustrating a sensor 100. FIG. 2 is a simplified cross section of the sensor 100. The sensor 100 includes a mass of a test material 102 over an insulator 104, which mass may be configured as a layer or film, but may be otherwise configured. The test material 102 may be, for example, a fissile material having a composition similar to the composition of a fuel rod used in a nuclear reactor. The test material 102 may also be any other selected material, such as metals used for cladding or structural components inside or outside the nuclear reactor, or any other solid. The test material 102 may have a thickness from about 0.1 mm to about 2 mm, such as from 0.2 mm to about 1 mm, or from about 0.4 mm to about 0.8 mm. The test material 102 may have a mass from about 0.1 μg to about 1,000 μg, from about 1 μg to about 500 μg, or from about 5 μg to about 100 μg.

The insulator 104 may be, for example, a ceramic disk, and may include one or more insulating materials such as aluminum oxide, magnesium oxide, silicon dioxide, zirconium oxide, silicon carbide, silicon nitride, aluminum nitride, beryllium oxide, etc. Additional insulators 106, 108 may be configured to define an open volume 110 adjacent the test material 102. The open volume 110 may contain a gas (e.g., air, nitrogen, argon, etc.) when the insulators 104, 106, 108 are assembled together. For example, the insulator 106 may have a cylindrical hole defining the open volume 110. Each insulator 104, 106, 108 may have approximately the same thickness, and may be from about 1 mm to about 20 mm, such as from about 2 mm to about 10 mm, or about 5 mm. Each insulator 104, 106, 108 may have an outside diameter from about 1 mm to about 20 mm, such as from about 2 mm to about 10 mm, or about 5 mm. The open volume 110 may have a volume from about 0.1 mm$^3$ to about 3,000 mm$^3$, such as from about 0.5 mm$^3$ to about 1,000 mm$^3$, or from about 1 mm$^3$ to about 500 mm$^3$.

FIG. 3 is an exploded view of the insulators 104, 106, 108 and the test material 102, with the insulators 104, 106, 108 separated for illustration purposes. The insulators 104, 106, 108 may be distinct bodies, as shown, or one or more may be combined into a unitary insulator. For example, the insulators 106, 108 may be a single body having a blind hole therein defining the open volume 110. A bonding material 112 may be disposed between the insulator 104 and the test material 102 to improve adhesion between the test material 102 and the insulator 104. The bonding material 112 may be, for example, an epoxy, a thermosetting adhesive, etc. The bonding material 112 may be a nonconductive material.

A conductor 114 may be disposed over the test material 102. For example, the conductor 114 may be a wire, trace, or line of a metal material. As shown in FIG. 3, the conductor 114 may be substantially linear. In other embodiments, the conductor 114 may have any selected shape, such as curved or angled. The conductor 114 may be connected to an electrical source 116 (FIGS. 1 and 2) by a pair of leads 118, and the electrical source 116 may be configured to provide an alternating current via leads 118 through the conductor 114. Another pair of leads 120 may be connected to a voltmeter 122 (FIGS. 1 and 2) configured to measure a voltage drop across the conductor 114. Optionally, more than one conductor 114 may be connected to the leads 118, 120. As shown in FIG. 1, the leads 118, 120 may be arranged in a circular pattern around the sensor 100, such that only two of the leads 118 appear in the cross section of FIG. 2.

The leads 118, 120 may extend radially outward from the conductor 114 along the insulator 104 (see FIG. 3), through holes 124 in the insulators 106, 108, and out the sensor 100 to the electrical source 116 and the voltmeter 122. For clarity, the portions of the leads 118, 120 extending through the insulators 106, 108 are omitted in FIG. 3, but are shown in FIG. 2. FIG. 3 shows eight holes 124 through the insulators 106, 108, which may accommodate eight leads 118, 120. However, any number of holes 124 may be provided.

As shown in FIG. 2, the sensor 100 may include multiple test materials 102 on multiple insulators 104, each adjacent its own open volume 110. Thus, the sensor 100 may be used to measure multiple samples simultaneously or in series. The sensor 100 may also include insulation 126 having holes to contain and separate the leads 118, 120 from one another. The insulation 126 may be the same as or a different material than the insulators 104, 106, 108. The insulation 126 may be generally cylindrical or any other selected shape.

A sheath 128 may surround the insulators 104, 106, 108, the test material 102, the bonding material 112, the conductor 114, the leads 118, 120, and the insulation 126. The sheath 128 may be a protective sheath, sized and configured to limit or prevent damage to the test material 102, the conductor 114, etc. The insulation 126 may be any shape that will fit within the sheath 128. The sheath 128 may include a metal or ceramic material. For example, the sheath 128 may be stainless steel, Inconel, titanium, molybdenum, or silicon carbide. The sheath 128 may be sealed to prevent the flow of material (e.g., gases) into or out of the sensor 100. In particular, the sheath 128 may be sealed at a point where the leads 118, 120 leave the insulation 126. For example, the sheath 128 may be sealed with a weld, a high-temperature cement, an epoxy, an acrylic, etc. The sheath may be generally cylindrical or any other selected shape. A cylindrical shape may be particularly beneficial for ease of manufacture, ease of modeling heat transfer, and ease of sealing the sensor 100. The sheath 128 may have an outer dimension (e.g., a diameter) from about 1 mm to about 20 mm, such as from about 5 mm to about 10 mm. The sheath 128 may have a length from about 10 mm to about 10 m, such as from about 20 mm to about 300 mm, or from about 50 mm to about 150 mm.

The sensor 100 may be used to measure a thermal conductivity of materials. As used herein, the term "measure" means and includes direct measurement or a parameter, as well as calculating a parameter based on one or more other parameters, which may in turn be directly measured or inferred. For example, the thermal conductivity of the test material 102 may not be directly observed, but may be determined by measuring parameters such as voltage across the conductor 114.

The sensor 100 may be placed in a reactor core in which a nuclear fuel undergoes decay (e.g., in a process used to generate electricity). The test material 102 of the sensor 100 may be selected to be the same chemical and radiological composition as the nuclear fuel (e.g., the test material 102 may be the same fissile material as the nuclear fuel). In some embodiments, the test material 102 may be processed or manufactured concurrently with the nuclear fuel. Thus, the test material 102 may be of the same composition and manufacturing date as the nuclear fuel. The test material 102 may be kept at the same in-pile conditions as the nuclear fuel such that the test material 102 maintains the same properties as the nuclear fuel. Therefore, measurements of the test material 102 may be analogous to measurements of the nuclear fuel, and measurements of the test material 102 may be used as a surrogate to direct evaluation of the nuclear fuel.

The sensor 100 may be used to measure thermal conductivity based on the three-omega (3-$\omega$) method, which is described generally in "Analysis of 3 $\omega$ method for thermal conductivity measurement," Hainan Wang & Mihir Sen, *International Journal of Heat and Mass Transfer*, March 2009, the entire disclosure of which is hereby incorporated herein by this reference. For example, an alternating current may be provided (e.g., from the electrical source 116) through the conductor 114 to heat the test material 102. The alternating current, having a frequency $\omega$, may induce periodic joule heating at a frequency 2$\omega$.

A voltage may be measured (e.g., with the voltmeter 122) as a function of time across the conductor 114. There may be a delay between heating of the test material 102 and the temperature response of the voltage across the conductor 114, which is dependent on the thermal conductivity of the test material 102. The voltage measured may include a component having the frequency $\omega$ of the alternating current and a component having a frequency 3$\omega$. A thermal conductivity of the test material 102 may then be calculated based on the 3-$\omega$ method.

For example, an alternating current (AC) voltage may be supplied to the conductor 114 at frequency $\omega$. The AC voltage may cause periodic heating of the test material 102, oscillating at frequency 2$\omega$ (i.e., two times $\omega$). The periodic heating may cause a third harmonic in the voltage signal across the conductor 114 at a frequency of 3$\omega$. The amplitude of this third harmonic depends on the thermal properties of the environment (in this example, the conductor 114 and the open volume 110), and thus may be used to infer the thermal conductivity of the test material 102.

Multiple samples of the test material 102 may be instrumented and tested concurrently and compared to one another for data redundancy. In some embodiments, different samples may be tested at different times. The test material 102 may be used in a nondestructive manner, such that thermal conductivity may be measured at multiple points in time. A reactor in which the sensor 100 is placed may be operated according to standard procedures while measuring the thermal conductivity of the test material 102. Parameters of the reactor (e.g., energy output, temperature, etc.) may be measured during operation. After operating for a period of time, the reactor irradiation may be stopped (e.g., by removing nuclear fuel). A sample of the nuclear fuel (i.e., an additional sample, other than the test material 102) may be removed and tested out-of-pile in another manner to compare the information collected from the sensor 100 to another test method. For example, the sample may be tested by other steady-state or transient methods (e.g., as described in U.S. Pat. No. 5,667,300, "Non-contact photothermal method for measuring thermal diffusivity and electronic defect properties of solids," granted Sep. 16, 1997, and U.S. Pat. No. 4,928,254, "Laser flash thermal conductivity apparatus and method," granted May 22, 1990, the entire disclosure of each of which is hereby incorporated herein by this reference). Thus, the data collected while the sensor 100 is in the reactor may be validated by subsequent testing of the nuclear fuel.

Sensors 100 and methods described herein may have various benefits, particularly for nuclear reactors. The sensors 100 may be relatively inexpensive to manufacture and operate, such that multiple sensors 100 may be used concurrently to collect thermal conductivity at various locations during reactor operation, and to generate a map of thermal conductivity. This information may be used to identify abnormal operating conditions to improve the design and operation of reactors. The sensors 100 may be relatively small in comparison with conventional test equipment, such that the presence of multiple sensors 100 in-pile may not influence the reaction to a significant degree. The sensors 100 may use relatively low power, such that they may be operated with commonly available power sources (e.g., from a 110 volt AC source). The sensors 100 may use relatively small amounts of the test material 102, such as in the range of micrograms (e.g., from about 0.1 µg to about 1,000 µg), to obtain bulk properties of the test material 102.

The sensors 100 may be encapsulated, and may be more robust than conventional test equipment, such that data may be collected where previously no data or limited data has been available (e.g., inside a reactor core during irradiation).

The sensors 100 may have relatively high accuracy and resolution in comparison with conventional test equipment, such as thermocouples and conventional thermal conductivity probes. Furthermore, the sensors 100 and use thereof in-pile may be relatively easier to implement than conventional test equipment. Conventional in-core thermal conductivity measurements require relatively large samples of materials to be tested (e.g., fuel rodlets approximately 20 mm to 400 mm in length containing many grams of fuel). These tests typically employ a dedicated experiment which may cost millions of dollars to implement (including fabrication, safety analyses, and installation). There are also limited test positions in reactors that can accommodate such a test. The sensors 100 described herein may be inserted into various test positions easily and require less analysis because the amount of test material 102 may be very low.

The sensors 100 may be manufactured in various configurations, such as with different test materials 102, different thicknesses of the test material 102, different thicknesses of the insulators 104, 106, 108, etc. This flexibility may be beneficial for other measurements. Furthermore, use of the sensors 100 may lower costs and complexity for obtaining data.

In some embodiments, the sensor 100 may be formed by providing the test material 102 over the insulator 104 using the bonding material 112. For example, a layer of the bonding material 112 may be deposited onto a surface of the insulator 104, and a layer of the test material 102 may be deposited onto the bonding material 112. The bonding material 112 may react, be cured, or otherwise caused to form a bond between the insulator 104 and/or the test material 102. The conductor 114 may be provided over and in contact with the test material 102. The leads 118, 120 may be connected to the conductor 114 to enable connection to the electrical source 116 and the voltmeter 122. The insulator 106 may be placed adjacent the insulator 104, and the insulator 108 may be placed adjacent the insulator 108 to form the open volume 110. The insulators 104, 106, 108 may optionally be bonded to one another. A gas may be sealed inside the open volume 110, either by the insulators 104, 106, 108, or by the sheath 128 surrounding the insulators 104, 106, 108.

In some embodiments, one or more sensors 100 may be fabricated concurrently with fuel rods or near the same time that fuel rods are fabricated, and the test material 102 may be drawn from a representative sample of the material used to form the fuel rods. The sensors 100 may be stored together with the fuel rods before the fuel rods are used in a reactor, so that the sensors 100 and the fuel rods experience substantially the same environmental conditions over their lifetimes. Thus, when the sensors 100 are used in a reactor, the sensors 100 may still have substantially the same composition as the fuel rods. Therefore, the information obtained by testing the sensor 100 may be analogous to information that would be obtained by direct observation of the fuel rods.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention. Further, embodiments of the disclosure have utility with different and various processes and systems.

What is claimed is:

1. A sensor for measuring thermal conductivity, the sensor comprising:
   an insulator;
   a test material over the insulator;
   a conductor over the test material;
   a gas within an open volume adjacent the test material and the conductor;
   an electrical source configured to provide an alternating current through the conductor to heat the test material; and
   a pair of leads connected to the conductor and configured to connect to a voltmeter for measuring a voltage drop across the conductor.

2. The sensor of claim 1, further comprising a bonding material between the test material and the insulator.

3. The sensor of claim 1, wherein the insulator comprises a generally cylindrical disk.

4. The sensor of claim 1, further comprising another insulator at least partially defining the open volume adjacent the test material and the conductor.

5. The sensor of claim 1, further comprising a sheath surrounding the insulator, the test material, and the conductor.

6. The sensor of claim 1, further comprising:
   a second insulator;
   a second test material over the second insulator;
   a second conductor over the second test material;
   a second gas within a second open volume adjacent the second test material and the second conductor; and
   a second pair of leads connected to the second conductor and configured to connect to the voltmeter;
   wherein the electrical source is configured to provide a second alternating current through the second conductor to heat the second test material.

7. The sensor of claim 1, wherein the test material comprises a fissile material.

8. The sensor of claim 1, wherein the test material has a thickness between about 0.1 mm and about 2 mm.

9. The sensor of claim 1, wherein the insulator, the test material, the gas, the conductor, and at least a portion of the leads are disposed within a sheath.

10. The sensor of claim 9, wherein the sheath is generally cylindrical and has an outside diameter between about 1 mm and about 20 mm.

11. The sensor of claim 9, wherein the sheath comprises a ceramic.

12. A method of forming a sensor, comprising:
    providing a test material over an insulator;
    providing a conductor over and in contact with the test material;
    sealing a gas within an open volume adjacent the test material and the conductor;
    connecting the conductor to an electrical source configured to provide an alternating current through the conductor to heat the test material; and
    connecting a pair of leads to the conductor, the pair of leads configured to connect to a voltmeter for measuring a voltage drop across the conductor.

13. The method of claim 12, wherein providing a test material over an insulator comprises bonding the test material to the insulator.

14. The method of claim 12, further comprising sealing the insulator, the test material, and the conductor within a sheath.

15. The method of claim 12, wherein providing a test material over an insulator comprises providing a test material having a composition in common with a composition of a nuclear fuel rod.

* * * * *